United States Patent
Petereit et al.

(10) Patent No.: US 9,276,644 B2
(45) Date of Patent: Mar. 1, 2016

(54) SYSTEM HAVING A BOUNDARY CONDUCTOR UNIT AND AN INDEPENDENT MOBILE UNIT

(75) Inventors: Steffen Petereit, Freiberg A. N. (DE); Christoph Koch, Stuttgart (DE); Amos Albert, Leonberg (DE)

(73) Assignee: Robert Bosch GmbH, Stuttgart (DE)

( * ) Notice: Subject to any disclaimer, the term of this patent is extended or adjusted under 35 U.S.C. 154(b) by 155 days.

(21) Appl. No.: 14/126,889

(22) PCT Filed: Apr. 26, 2012

(86) PCT No.: PCT/EP2012/057675
§ 371 (c)(1),
(2), (4) Date: Apr. 7, 2014

(87) PCT Pub. No.: WO2012/171704
PCT Pub. Date: Dec. 20, 2012

(65) Prior Publication Data
US 2014/0242907 A1  Aug. 28, 2014

(30) Foreign Application Priority Data
Jun. 17, 2011  (DE) .......................... 10 2011 077 673

(51) Int. Cl.
*H04B 5/00* (2006.01)
*G05B 15/02* (2006.01)

(52) U.S. Cl.
CPC ............. *H04B 5/0075* (2013.01); *G05B 15/02* (2013.01)

(58) Field of Classification Search
CPC ............ H04B 5/00; H04B 5/02; H04B 5/007; H04W 84/18; H04W 84/185
USPC ....................................... 455/41.1
See application file for complete search history.

(56) References Cited

U.S. PATENT DOCUMENTS

| | | | | |
|---|---|---|---|---|
| 7,081,821 B2* | 7/2006 | So | ......... | A01K 15/023 119/720 |
| 7,126,475 B2* | 10/2006 | So | ......... | A01K 15/023 119/720 |
| 7,382,222 B1* | 6/2008 | Manetakis | .......... | H01F 17/0006 336/200 |
| 2002/0073933 A1* | 6/2002 | Oakman | .............. | A01K 15/023 119/721 |
| 2009/0051547 A1* | 2/2009 | McFarland | ........... | A01K 15/023 340/573.3 |
| 2012/0100880 A1* | 4/2012 | Baek | ....................... | H04W 48/16 455/515 |

FOREIGN PATENT DOCUMENTS

| | | |
|---|---|---|
| GB | 1 417 858 | 12/1975 |
| WO | 99/15941 A1 | 4/1999 |
| WO | 03/065140 A2 | 8/2003 |

OTHER PUBLICATIONS

International Search Report corresponding to PCT Application No. PCT/EP2012/057675, mailed Jul. 5, 2012 (German and English language document) (7 pages).
Prigge, Eric A. et al., Signal Architecture for a Distributed Magnetic Local Positioning System, IEEE Sensors Journal, vol. 4, No. 6, Dec. 2004, pp. 864-873, IEEE.

* cited by examiner

*Primary Examiner* — April G Gonzales
(74) *Attorney, Agent, or Firm* — Maginot, Moore & Beck LLP

(57) ABSTRACT

A system has a boundary conductor unit, which is intended to emit a boundary signal, and an at least partially independent mobile unit, which is intended to detect a boundary provided by the boundary conductor unit by means of cross-correlation. It is proposed that the mobile unit has at least one receiving unit which is intended to receive data transmitted by means of the boundary signal.

7 Claims, 3 Drawing Sheets

SYSTEM HAVING A BOUNDARY CONDUCTOR UNIT AND AN INDEPENDENT MOBILE UNIT

This application is a 35 U.S.C. §371 National Stage Application of PCT/EP2012/057675, filed on Apr. 26, 2012, which claims the benefit of priority to Serial No. DE 10 2011 077 673.7, filed on Jun. 17, 2011 in Germany, the disclosures of which are incorporated herein by reference in their entirety.

BACKGROUND

A system having a boundary conductor unit has already been proposed which is provided for emitting a boundary signal, and having an at least partially independent mobile unit which is provided for detecting a boundary by the boundary conductor unit by means of the boundary signal.

SUMMARY

The disclosure is based on a system having a boundary conductor unit which is provided for emitting a boundary signal, and having an at least partially independent mobile unit which is provided for detecting a boundary provided by the boundary conductor unit by means of a cross-correlation.

It is proposed that the mobile unit has at least one receiving unit which is provided for receiving a data transmission by means of the boundary signal. A "boundary conductor unit" is intended to be especially a unit which limits an area on at least one side by means of a spatial extent of an electrical conductor. A boundary conductor preferably conducts an electrical current which is modulated with the boundary signal. The electrical current advantageously causes a magnetic field modulated with the boundary signal in the area limited by the boundary conductor unit. "Provided" is intended to be understood particularly as specially programmed, designed and/or equipped. In particular, a "boundary signal" is intended to be understood to be a signal which has at least one characteristic which differs within the limited area and outside the limited area. The boundary signal can be received preferably during an operation within a limited area. The boundary signal is preferably designed as a binary signal. The boundary signal preferably has at least one characteristic provided, in particular, only for correlation. By itself, this characteristic is not used for data transmission. A "binary signal" is intended to be understood especially to be a signal which has an information item composed exactly of two different information states. The boundary signal preferably has a periodically repetitive binary sequence. The term "emitting" is to be understood, in particular, to mean that the boundary conductor unit emits a power of the boundary signal into a space surrounding the boundary conductor unit. In particular, "partially independent" is intended to be understood in this context to mean that the mobile unit determines at least one procedure on the basis of information which it has collected itself. In particular, the mobile unit determines on the basis of an information item a procedure which depends on a movement relative to the boundary conductor unit, especially on reaching the boundary. The mobile unit preferably determines at least one characteristic variable of a path which it travels. For example, the mobile unit could turn around when reaching the boundary. "Mobile" is intended to be understood in this context to mean that the unit moves relative to the boundary conductor unit in at least one period of time. The unit preferably comprises a drive unit which is provided for moving along the mobile unit relative to the boundary conductor unit. The mobile unit advantageously comprises a coupling means for coupling, which is, in particular, detachable by an operator, to a mobile object and/or advantageously to an animal. In particular, a "unit" is intended to be understood as a mobile unit appearing to be appropriate to the expert which moves freely in at least one state within a provided area limited by the boundary conductor unit on at least one side. The unit preferably handles a task during operation within the area. Alternatively or additionally, the mobile unit could be provided for counteracting a movement of an object and/or advantageously of an animal out of the area limited by the boundary conductor unit. For example, the unit could be designed as a lawn mowing robot, as a polishing robot and/or as another unit appearing to be appropriate to the expert. Alternatively, the unit could be designed, for example, as a collar for a dog and/or a cat. The mobile unit preferably has a cableless power supply, especially a battery. A "boundary" is intended to be understood in particular, as a plane which closes an area, in which the mobile unit moves during an operation, on at least one side. The boundary advantageously encloses an area around 360 degrees. A "cross-correlation" is intended to be understood in particular, as a comparison of two signals for similarity, the signals being displaced in time with respect to one another. In particular, the term "to detect" is intended to be understood to mean that the independent mobile unit receives the boundary signal and determines by an evaluation of the boundary signal a characteristic variable which signals at least one transgression of the boundary during the transgression. A "receiving unit" is intended to be understood to be a unit which is provided for receiving a power radiated by the boundary conductor unit. The receiving unit advantageously has at least one coil which receives the power radiated by the boundary conductor unit during an operation. In particular, a "data transmission" is intended to be understood to be a transmission of at least one information item by the boundary conductor unit to the mobile unit and/or especially from the mobile unit to the boundary conductor unit. In particular, the boundary conductor unit varies the boundary signal for data transmission. For example, the boundary conductor unit could modulate the boundary signal in analogue and/or digital frequency, amplitude and/or phase. Due to the embodiment according to the disclosure of the system, a particularly interference-proof boundary can be achieved with a constructionally simple and also particularly interference-proof data transmission.

In a further embodiment, it is proposed that the boundary conductor unit is provided for emitting the boundary signal which is designed as a pseudorandom signal as a result of a which a low sensitivity to interference with respect to narrowband interference can be achieved. In particular, a "pseudorandom signal" is intended to be a signal which has an autocorrelation with a major peak which is at least twice as large, preferably at least four times as large as possibly present secondary peaks of the autocorrelation. The boundary signal has preferably a statistical characteristic of white noise. The boundary signal has preferably a binary bit pattern. In particular, the boundary signal is designed as a boundary signal appearing to the appropriate to the expert, preferably however as a JPL sequence and/or particularly preferred as a gold sequence.

It is also proposed that the boundary conductor unit has at least one boundary conductor which forms at least one conductor loop, as a result of which inductive data transmission and a reliable boundary are possible in a structurally simple manner. In particular, a "boundary conductor" is intended to be understood as an electrically conductive cable which runs along the boundary. A "conductor loop" is intended to be understood as an electrically conductive cable which encloses an area. The boundary conductor is preferably provided for enclosing an area greater than 5 m², particularly advantageously greater than 20 m².

The enclosed area preferably forms the area limited by the boundary conductor unit. In this context, the boundary conductor is advantageously inserted a few centimeters into a bottom of the limited area. Alternatively or additionally, the boundary conductor could rest on the floor and, particularly, be grown into a green covering the floor.

Furthermore, it is proposed that the receiving unit is provided for detecting an inductive component of the boundary signal as a result of which a particularly small antenna can be used, especially a coil. In particular, the receiving unit has an antenna, preferably a number of antennae. An "inductive component" is intended to be understood in particular to mean that the receiving unit is provided for receiving an inductive field and/or an inactive component of an electromagnetic field. The receiving unit is arranged preferably in a near field of the boundary conductor unit during an operation. A "near field" is intended to be understood in particular as a field at a distance from a transmitter of the field which is smaller than twice a medium wavelength of the field.

It is also proposed that the mobile unit has a computing unit which is provided for evaluating the boundary signal by means of a cross-correlation with a correlation bit pattern as a result of which a particularly low influence of disturbances on an evaluation of the reception can be achieved. A "computing unit" is intended to be understood, in particular, as a unit having an information input, information processing and an information output. The computing unit has advantageously at least one processor, one memory, input and output means, further electrical components, an operating program, regulating routines, control routines and/or calculation routines.

The components of the computing unit are arranged preferably on a common board and/or arranged advantageously in a common housing. In particular, a "correlation bit pattern" is intended to be understood as a sequence of bits which is equal to a bit pattern transmitted in at least one operating state by the boundary signal. The computing unit is provided preferably for generating and/or storing the correlation bit pattern. "Evaluating" is intended to be understood, in particular, to mean that the computing unit determines from at least one characteristic of the boundary signal at least one information item about a site relative to the boundary conductor unit.

It is also proposed that the computing unit is provided for generating at least two different correlation bit patterns for the cross-correlation as a result of which a data transmission and/or simultaneous use of a number of systems in spatial vicinity is/are possible in a structurally simple manner. In particular, a data transmission without synchronization to a clock transmitted with the boundary signal is possible. Furthermore, it can be prevented in a structurally simple manner that a command does not reach the mobile unit due to a time-limited disturbance as a result of which a return channel can be advantageously omitted. In particular, "different correlation bit patterns" are intended to be understood to be bit patterns which are at least essentially orthogonal to one another. This means, in particular, that during a correlation two identical bit patterns, a major peak of a result is at least twice as large, advantageously 4 times as large as in a correlation of two orthogonal bit patterns. The computing unit is preferably provided for correlating a received boundary signal with a first correlation bit pattern and/or with a second correlation bit pattern during an operation. In particular, the computing unit is provided for correlating a time interval of the boundary signal with the first correlation bit pattern and the second correlation bit pattern. Alternatively, the computing unit is provided for correlating a first time interval of the boundary signal with the first correlation bit pattern and a second time interval of the boundary signal with the second correlation bit pattern.

In an advantageous embodiment, it is proposed that the computing unit allocates an operating mode to the first correlation bit pattern and a command to the second correlation bit pattern as a result of which a particularly simple implementation can be achieved. An "operating mode" is intended to be understood in particular as an operating state of the mobile unit in which the unit handles a task, for example lawn mowing, polishing or monitoring a site. In particular, a "command" is intended to be understood as a data transmission which influences a behavior of the mobile unit. The command advantageously causes a reaction, appearing to be appropriate to the expert, of the mobile unit, for example approaching a particular point, emergency stop and/or coming to eat food. The correlation bit pattern to which a command is allocated is transmitted preferably during an entire execution of the command. Alternatively, the correlation bit pattern, which is allocated to a command, could be emitted up to a confirmation and/or for an intended period of time.

Furthermore, it is proposed that the computing unit is provided for detecting a command transmitted by at least two different phase angles of a bit pattern of the boundary signal by which means a high data transmission rate is possible in a structurally simple manner. A "phase angle" is intended to be understood to be, in particular, that the boundary conductor unit displaces a time of an emission of a particular bit of the bit pattern within a period with respect to a previous period of the bit pattern.

The disclosure is also based on an independent mobile unit of a system according to the disclosure.

Furthermore, the disclosure is based on a boundary conductor unit of a system according to the disclosure.

In addition, the disclosure is based on a method having at least one boundary conductor unit which emits a boundary signal during an operation, and having an at least partially independent mobile unit which detects a boundary provided by the boundary conductor unit by means of a cross-correlation.

A data transmission is proposed between the boundary conductor unit and the mobile unit by means of the boundary signal.

BRIEF DESCRIPTION OF THE DRAWINGS

Further advantages are obtained from the description of the following drawing. In the drawing, two exemplary embodiments of the disclosure are shown. The drawing, the description and the claims contain numerous features in combination. The expert will also suitably consider the features individually and combine them to form appropriate further combinations.

In the drawings.

DETAILED DESCRIPTION

Figure 1:
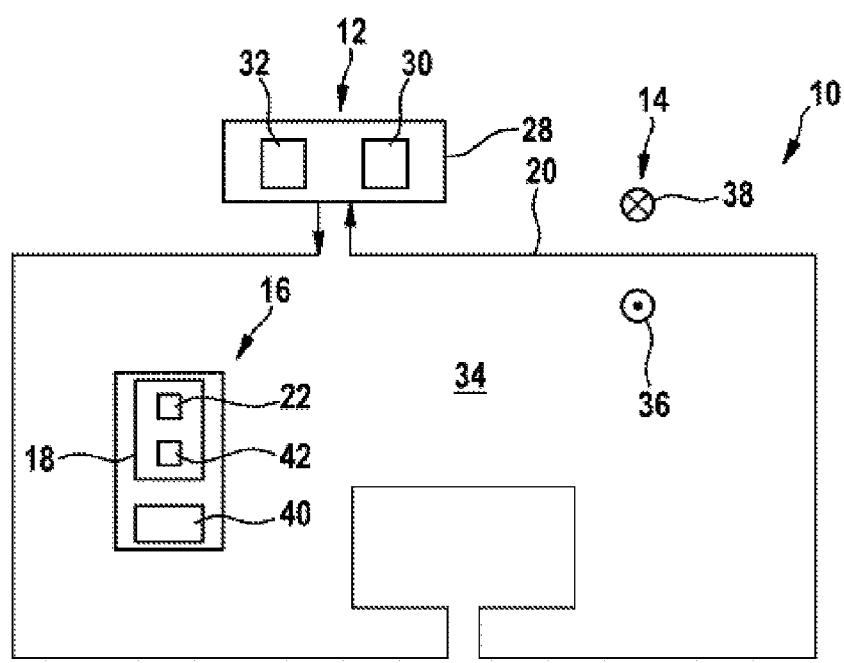
FIG. 1 shows a system according to the disclosure having a boundary conductor unit and a mobile unit.

FIG. 1 shows a system 10 having a boundary conductor unit 12 and an independent mobile unit 16. The boundary conductor unit 12 comprises a boundary conductor 20 and a base station 28. The base station 28 has an input unit 30 and a signal generator 32. The signal generator couples a boundary signal 14 to the boundary conductor 20 during an operation. The boundary signal is designed as a pseudorandom signal. For this purpose, the signal generator 32 has a code generator, not shown in greater detail, which is provided for generating gold sequences. The boundary conductor 20 forms a conductor loop which encloses an area 34. Coupling the boundary signal 14 into the boundary conductor 20 causes an electrical current in the boundary conductor 20. The electrical current causes a magnetic field 36 in the area 34 within the boundary signal 14 and a magnetic field 38 outside the conductor loop of the boundary conductor 20. The magnetic fields 36, 38 have opposite directions relative to a plane spanned by the area 34.

The mobile unit 16 is formed as an independent lawnmower. The mobile unit 16 mows the area limited by the boundary conductor 20 independently during an operation. The mobile unit 16 has a receiving unit 18 and a drive unit 40. The drive unit 40 moves the mobile unit during an operation. The receiving unit 18 has a computing unit 22 and an antenna 42. The antenna 42 is constructed as a coil. The antenna 42 of the receiving unit 18 thus detecting an inductive component of the boundary signal 14. The computing unit 22 is constructed as a microcontroller. It comprises a correlation calculating routine which is provided for performing a cross-correlation between a correlation bit pattern and the received boundary signal 14 in an operational state. For this purpose, the computing unit 22 has a code generator, not shown in greater detail here, which is provided for generating gold sequences. The code generator of the computing unit 22 generates an identical code as the code generator of the boundary conductor unit 12 in at least one operating state.

Figure 2:
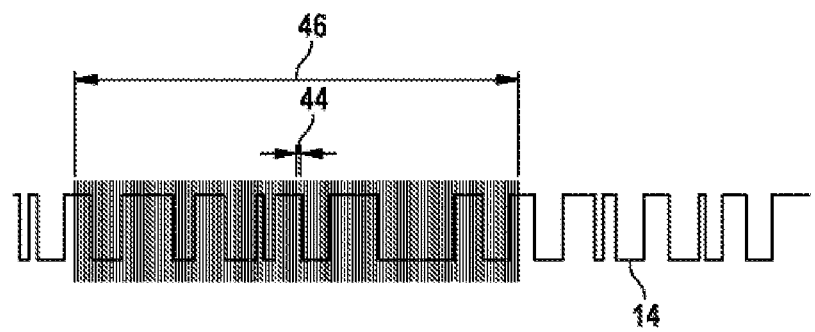
FIG. 2 shows a boundary signal received by the mobile unit and a scanning of the boundary signal.
Figure 3:
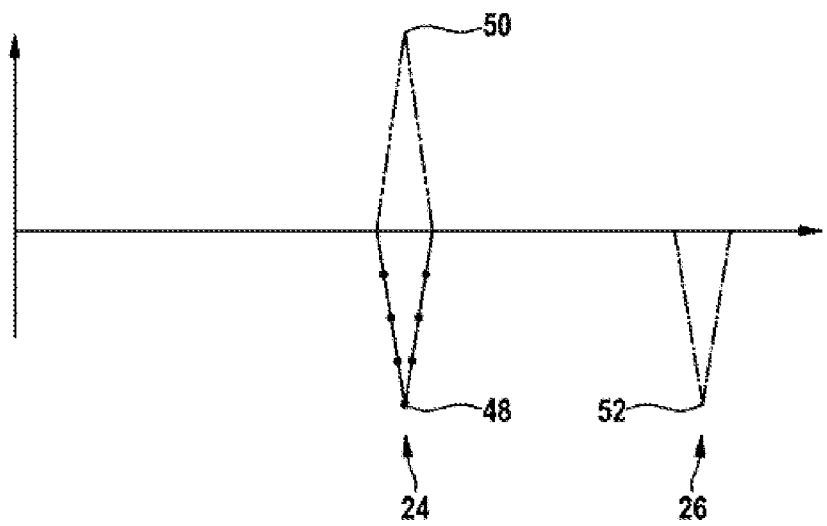
FIG. 3 shows results of a cross-correlation of the received boundary signal with correlation bit patterns of a first and a second exemplary embodiment.

The computing unit 22 has an analogue/digital converter, not shown in greater detail, which digitizes the received boundary signal 14 with a sampling period 44 as shown in FIG. 2. The received boundary signal shown has disturbances. The sampling period 44 of the analogue/digital converter is shorter than a period of one bit of the boundary signal 14. The computing unit 22 correlates periodically a time interval 46 of the boundary signal 14 with the generated correlation bit pattern which is equal to a bit pattern of the boundary signal 14. Possible results of the correlation are shown in FIG. 3 without possible disturbances. The results have in each case a positive or negative peak 48, 50, 52 when the receiving unit receives the boundary signal 14 and the bit pattern of the boundary signal 14 and the correlation bit pattern match. When the mobile unit is arranged within the limited area 34, the results of the periodically repeated correlation have in each case a negative peak 48. When the mobile unit 16 has left the limited area 34, the results of the periodically repeated correlation in this incident have in each case a positive peak 50 because the magnetic fields 36, 38 received by the receiving unit 18 have different directions within and outside of the area 34.

The input unit 30 has an operating element, not shown in greater detail, by means of which the operator can issue a command to the mobile unit 16. To transmit the command, the signal generator 32 changes the emitted boundary signal 14. The boundary signal 14 thus has data which are allocated to the command during the transmission of the command. The receiving unit 18 of the mobile unit 16 evaluates the boundary signal 14 and thus receives the data transmission through the boundary signal 14.

Figure 4:
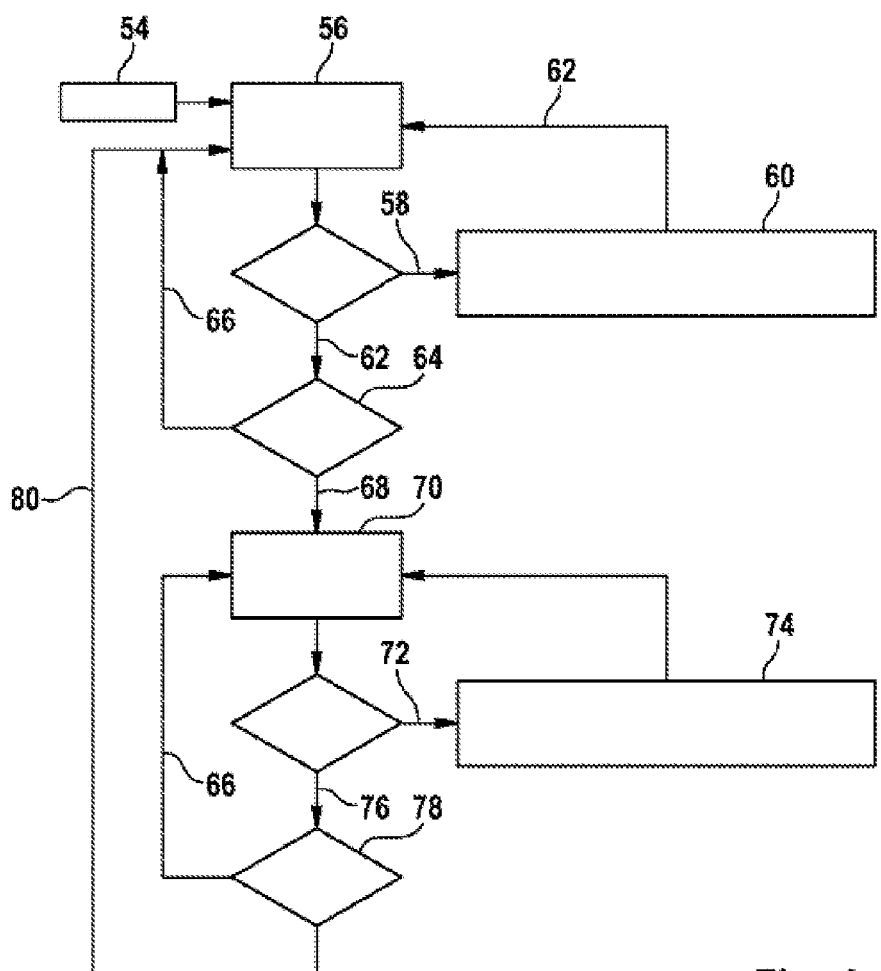
FIG. 4 shows a flow chart of an operation and of a data transmission of the system from FIG. 1 of the first exemplary embodiment.

In a first exemplary embodiment, the signal generator of the boundary conductor unit 12 generates different bit patterns for the data transmission. The bit patterns are allocated to different commands and/or operating states. The computing unit 22 of the mobile unit 16 generates different correlation bit patterns for the cross-correlation during an operation. In FIG. 4, a possible operating sequence is shown.

After an initialization 54, the computing unit 22 begins a search 56 for an operating bit pattern by means of the correlation with an operating bit pattern. In this context, the computing unit 22 stops the mobile unit 16 via the drive unit 40. When the computing unit 22 has found 58 the operating bit pattern, the mobile unit 16 begins to work 60. In this context, the computing unit 22 continues to correlate the received signal with the operating bit pattern. When the computing unit 22 no longer finds 62 the operating bit pattern in the received signal, the computing unit 22 stops the mobile unit 16. The computing unit 22 begins the search 56 for the operating bit pattern again.

When the computing unit 22 does not find 62 the operating bit pattern, the computing unit 22 checks whether a maximum search period provided has elapsed 64. When the maximum search period has not elapsed 66, the computing unit 22 continues to search 56 for the operating bit pattern in the boundary signal 14. When the maximum search period for the operating bit pattern, in this case for example one second, has elapsed 68, the computing unit 22 searches 70, by means of the correlation with a command bit pattern, for a further command, for example for a return command. During the search of the command bit pattern, the mobile unit 16 is stopped.

When the computing unit 22 has found 72 the command bit pattern, the mobile unit 16 executes the command 74. When the computing unit 22 does not find 76 the command bit pattern, the computing unit 22 checks whether a maximum search period provided has elapsed 78. When the maximum search period for the command bit pattern has elapsed 80, the computing unit 22 here searches 56 again for the operating bit pattern. Alternatively, the computing unit 22 could initially search for a further command bit pattern or a number of further command bit patterns in accordance with the same principle.

The input unit 30 of the boundary conductor unit 12 has an operating element, not represented in greater detail, which interrupts an emission of the operating bit pattern as a result of which stopping and/or pausing the mobile unit 16 is possible in a constructionally simple manner. Furthermore, the input unit 30 of the boundary conductor unit 12 has an operating element, not shown in greater detail, by means of which the operator can select the operating bit pattern from an operation. Alternatively, an operating bit pattern could be preset ex-factory in a boundary conductor unit and a mobile unit. In a further alternative, a boundary conductor unit could independently select an operating bit pattern, especially randomly and/or in that the boundary conductor unit searches in a signal captured by the boundary conductor for any operating bit patterns occupied by other systems.

The mobile unit 16 detects the operating bit pattern during a commissioning in that it searches a set of bit patterns for the bit pattern emitted by the boundary conductor unit. Alternatively, an operator could input the operating bit pattern manually into a mobile unit. The command bit patterns are selected depending on the operating bit pattern. Alternatively, each selected bit pattern deviating from the operating bit pattern could be allocated to an identical command, especially to a return command.

In an alternative exemplary embodiment, a computing unit 22 of a mobile unit 16 of a system 10 could acquire a command which is transmitted by two different phase angles 24, 26 of an individual bit pattern of a boundary signal 14. The phase angles 24, 26 of the boundary signal 14 are apparent in a result of a correlation due to a different arrangement of the peaks 48, 52. The computing unit 22 correlates the received boundary signal 14 with a correlation bit pattern which corresponds to the bit pattern of the boundary signal 14. The computing unit 22 here correlates time intervals of the boundary signal 14 periodically with a correlation bit pattern which correspond to a period of the bit pattern of the boundary signal 14. A boundary conductor unit 12 of the system 10 varies a phase angle of the bit pattern of the boundary signal 14. As shown in FIG. 3, this displaces a position of a peak of a result of the correlation. The boundary signal 14 transmits data to the mobile unit 16 by this means.

The invention claimed is:

1. A system comprising:
    a boundary conductor unit configured to emit a boundary signal; and
    an at least partially independent mobile unit configured to detect a boundary provided by the boundary conductor unit, wherein the mobile unit includes at least one receiving unit configured to receive a data transmission with reference to the boundary signal; and
    a computing unit operatively connected to the receiving unit, the computing unit being configured to:
        generate at least a first correlation bit pattern and a second correlation bit pattern;
        perform a first cross-correlation evaluation of the first correlation bit pattern with another correlation bit pattern received in the boundary signal;
        perform a second cross-correlation evaluation of the second correlation bit pattern with the other correlation bit pattern received in the boundary signal; and
        allocate an operating mode to the first correlation bit pattern and a command to the second correlation bit pattern.

2. The system as claimed in claim 1, wherein the boundary signal emitted by the boundary conductor unit is a pseudo-random signal.

3. The system as claimed in claim 1 wherein the boundary conductor unit includes at least one boundary conductor, which forms at least one conductor loop.

4. The system as claimed in claim 1, wherein the at least one receiving unit is configured to detect an inductive component of the boundary signal.

5. The system as claimed in claim 1, wherein the computing unit is configured to detect a command transmitted by at least two different phase angles of the correlation bit pattern of the boundary signal.

6. A method comprising:
    emitting a boundary signal with at least one boundary conductor unit during an operation;
    transmitting data encoded in the boundary signal between the boundary conductor unit and the mobile unit; and
        generating with a computing device in the mobile unit at least a first correlation bit pattern and a second correlation bit pattern;
        performing with the computing device in the mobile unit a first cross-correlation evaluation of the first correlation bit pattern with another correlation bit pattern received in the boundary signal;
        performing with the computing device in the mobile unit a second cross-correlation evaluation of the second correlation bit pattern with the other correlation bit pattern received in the boundary signal; and
        allocating with the computing device in the mobile unit an operating mode to the first correlation bit pattern and a command to the second correlation bit pattern.

7. A system comprising:
    a boundary conductor unit configured to emit a boundary signal; and
    an at least partially independent mobile unit configured to detect a boundary provided by the boundary conductor unit, wherein the mobile unit includes at least one receiving unit configured to receive a data transmission with reference to the boundary signal; and
    a computing unit operatively connected to the receiving unit, the computing unit being configured to:
        generate a correlation bit pattern;
        perform a cross-correlation evaluation of the correlation bit pattern with another correlation bit pattern received in the boundary signal; and
        detect a command transmitted by at least two different phase angles of the correlation bit pattern of the boundary signal.

* * * * *